United States Patent
Niedringhaus et al.

(10) Patent No.: US 11,242,589 B2
(45) Date of Patent: *Feb. 8, 2022

(54) METHOD FOR EXTENDING THE CAMPAIGN LIFE OF STABILIZERS FOR A COATING LINE

(71) Applicant: AK Steel Properties, Inc., West Chester, OH (US)

(72) Inventors: Joyce C. Niedringhaus, Liberty Township, OH (US); Daniel J. Cadotte, Middletown, OH (US); William F. Sersion, Jr., Middletown, OH (US); Tony Lee Webb, II, Hamilton, OH (US)

(73) Assignee: Cleveland-Cliffs Steel Properties Inc.

( * ) Notice: Subject to any disclaimer, the term of this patent is extended or adjusted under 35 U.S.C. 154(b) by 565 days.

This patent is subject to a terminal disclaimer.

(21) Appl. No.: 15/583,450

(22) Filed: May 1, 2017

(65) Prior Publication Data
US 2018/0002796 A1    Jan. 4, 2018

Related U.S. Application Data

(60) Provisional application No. 62/329,603, filed on Apr. 29, 2016.

(51) Int. Cl.
*C23C 2/00* (2006.01)
*F16C 33/04* (2006.01)
(Continued)

(52) U.S. Cl.
CPC ........... *C23C 2/00* (2013.01); *C04B 35/18* (2013.01); *C23C 2/003* (2013.01); *F16C 13/02* (2013.01);
(Continued)

(58) Field of Classification Search
CPC . C23C 2/00; C23C 2/003; C04B 35/18; F16C 13/02; F16C 33/043; F16C 33/26;
(Continued)

(56) References Cited

U.S. PATENT DOCUMENTS

| 117,985 A | 8/1871 | Collier |
| 317,781 A | 5/1885 | Hemphill |

(Continued)

FOREIGN PATENT DOCUMENTS

| CN | 204898045 U | 12/2015 |
| DE | 102012103132 B3 | 5/2013 |

(Continued)

OTHER PUBLICATIONS

Rosenflanz, Anatoly. "Silicon Nitride and Sialon Ceramics." Current Opinion in Solid State and Materials Science, Elsevier, Jul. 24, 2000, www.sciencedirect.com/science/article/pii/S1359028600000048 (Year: 2000).*

(Continued)

*Primary Examiner* — Paul A Wartalowicz
*Assistant Examiner* — Ryan L Heckman
(74) *Attorney, Agent, or Firm* — Frost Brown Todd LLC

(57) ABSTRACT

A steel processing line includes a dip tub and a stab roll. The dip tub is filled with a quantity of molten metal. At least a portion of the stab roll is submerged in the quantity of molten metal. The stab roll includes two journals. Each journal is received by an opening defined by a roller sleeve including a ceramic or refractory material. The roller sleeve is disposed between each journal and a bearing block. An inner dimension of each roller sleeve and an outer dimension of each respective journal defines a clearance. The inner dimension of each roller sleeve and the outer dimension of each respective journal is configured such that the clearance persists as the stab roll and the pair of roller sleeves are (Continued)

heated by the molten metal. Alternatively, inserts are fastened to an outer surface of each journal in lieu of the roller sleeves.

19 Claims, 10 Drawing Sheets

(51) Int. Cl.
| | |
|---|---|
| *F16C 33/26* | (2006.01) |
| *F16C 43/02* | (2006.01) |
| *F16C 13/02* | (2006.01) |
| *C04B 35/18* | (2006.01) |
| *C01B 21/06* | (2006.01) |
| *C01B 33/26* | (2006.01) |

(52) U.S. Cl.
CPC ............ *F16C 33/043* (2013.01); *F16C 33/26* (2013.01); *F16C 43/02* (2013.01); *C01B 21/0602* (2013.01); *C01B 33/26* (2013.01); *F16C 2226/60* (2013.01); *F16C 2240/46* (2013.01)

(58) Field of Classification Search
CPC .. F16C 43/02; F16C 2226/60; F16C 2240/46; C01B 21/0602; C01B 33/26
See application file for complete search history.

(56) References Cited

U.S. PATENT DOCUMENTS

| | | | |
|---|---|---|---|
| 831,727 | A | 9/1906 | Loomis |
| 1,305,330 | A | 6/1919 | Woleven et al. |
| 2,115,465 | A | 4/1938 | Merten |
| 2,695,248 | A | 11/1954 | Ornitz et al. |
| 3,577,619 | A | 5/1971 | Strandel |
| 3,595,207 | A | 7/1971 | Stricker |
| 3,664,293 | A | 5/1972 | Hozumi et al. |
| 3,734,579 | A * | 5/1973 | Schumacher .......... B65G 39/09 384/584 |
| 3,861,012 | A | 1/1975 | Spaeder |
| 3,927,449 | A | 12/1975 | Gibble et al. |
| 4,416,137 | A | 11/1983 | Marshall |
| 5,072,689 | A * | 12/1991 | Nakagawa ............ F16C 33/043 118/419 |
| 5,411,462 | A | 5/1995 | Link |
| 5,538,558 | A | 7/1996 | Ookouchi et al. |
| 5,538,559 | A * | 7/1996 | Kleimeyer .............. F16C 33/04 118/423 |
| 5,571,328 | A | 11/1996 | Newland |
| 5,667,310 | A * | 9/1997 | Oyagi ..................... B05C 11/06 384/137 |
| 5,711,613 | A | 1/1998 | Ookouchi et al. |
| 5,718,766 | A * | 2/1998 | Vignot ...................... C23C 2/00 118/419 |
| 6,554,904 | B1 | 4/2003 | Gimpel et al. |
| 8,210,999 | B2 | 7/2012 | Hamayoshi et al. |
| 8,915,830 | B2 | 12/2014 | March et al. |
| 2003/0133632 | A1 | 7/2003 | Hall |
| 2010/0064968 | A1* | 3/2010 | Challaye ................. F16C 13/02 118/428 |
| 2012/0073103 | A1* | 3/2012 | March .................... C03B 35/183 29/402.08 |
| 2015/0068454 | A1* | 3/2015 | Blumenau ............... C23C 2/003 118/500 |
| 2018/0002796 | A1 | 1/2018 | Niedringhaus et al. |

FOREIGN PATENT DOCUMENTS

| | | |
|---|---|---|
| EP | 0346855 A2 | 12/1989 |
| EP | 0524851 | 1/1993 |
| EP | 0292953 | 11/1998 |
| FR | 2921135 | 3/2009 |
| JP | S55-150549 | 1/1980 |
| JP | 0230310 A * | 1/1990 |
| JP | H05-070915 A | 3/1993 |
| JP | 05287475 A * | 11/1993 |
| JP | H05-287475 | 11/1993 |
| JP | 2000-233986 | 8/2000 |
| JP | 2001-234924 A | 8/2001 |
| JP | 2003-306753 | 10/2003 |
| WO | WO 2010/111341 A1 | 9/2010 |
| WO | WO 2012/136713 | 10/2012 |
| WO | WO 2016/103044 A1 | 6/2016 |

OTHER PUBLICATIONS

Machine Translation of JP-05287475-A (Year: 1993).*
Machine Translation of JP-0230310-A (Year: 1990).*
European Communication dated Dec. 6, 2018 for Application No. 17724668.3, 3 pgs.
International Search Report and Written Opinion dated Aug. 25, 2017 for Application No. PCT/US17/30398.
Taiwanese Office Action dated Aug. 29, 2018 for Application No. 106114406, 14 pgs.
Saint Gobain Ceramics, "Advancer Silicon Nitride Bonded Silicon Carbide," Technical Bulletin, Jan. 2005, 1 page.
International Search Report and Written Opinion, dated Aug. 25, 2017, for International PCT Application No. PCT/US2017/030398.
International Search Report and Written Opinion dated Mar. 21, 2019 for Application No. PCT/US2018/066702, 11 pgs.
Thiruvenga, A. et al., "Mechanical Properties of Metals and their Cavitation Damage Resistance," Hydronautics Incorporated, Office of Naval Research Department of the Navy, Contract No. Nonr 3755(00) (FBM) 062-203, Jun. 1964, pp. 1-47.
U.S. Appl. No. 16/226,895.
U.S. Appl. No. 16/263,044; and.
U.S. Appl. No. 16/546,539.

* cited by examiner

METHOD FOR EXTENDING THE CAMPAIGN LIFE OF STABILIZERS FOR A COATING LINE

The present application claims priority from provisional patent application Ser. No. 62/329,603, entitled "Method for Extending the Campaign Life of Stabilizers for an Aluminizing Line," filed on Apr. 29, 2016. The disclosure of application Ser. No. 62/329,603 is incorporated herein by reference.

BACKGROUND

Aluminizing is a common process used in steel making to provide a thin aluminum coating on the surface of a steel substrate. The aluminizing process may be generally incorporated into a continuous aluminizing line where an elongate steel sheet is threaded through a series of rollers to subject the steel sheet to various treatment processes. During the aluminizing portion of this process, the steel sheet is manipulated through a bath of molten aluminum to coat all surfaces of the steel sheet. To aid in manipulation of the steel sheet, various components may be disposed within the molten aluminum bath. Some of these components may be subject to wear due to continuous movement of the components and/or the harsh environment due to the presence of molten aluminum. When wear reaches an unacceptable level, the continuous aluminizing line is shut down and the components therein are reworked. This procedure generally results in increased costs and undesirable manufacturing delays. However, these costs and delays may be reduced by increasing the service life of various components submerged within the aluminum bath. Accordingly, it may be desirable to include various features within an aluminizing line to improve the overall service life of components subject to wear. To overcome these challenges roller sleeves made of ceramic or refractory material are mechanically locked to a roller journal, thereby providing protection from wear. Alternatively, roller inserts made of ceramic or refractory materials are secured to an exterior surface of a roller journal to protect against wear.

SUMMARY

Steel journals for rollers rotating within molten aluminum baths encounter at least some abrasion and chemical attack when used within molten aluminum baths for aluminizing processes. Under some circumstances, this abrasion and/or chemical attach may lead to reduced duty cycles for such rollers. Thus, it may be desirable to reduce abrasion and/or chemical attack encountered with steel journals used in aluminizing processes. Ceramic or refractory materials provide superior resistance to abrasion and chemical attack encountered in environments surrounded by molten aluminum. However, challenges have been encountered with integrating ceramic or refractory materials into roller assemblies submerged in molten aluminum. Thus, the present application relates to structures and/or methods for incorporating ceramic or refractory materials into roller assemblies between a journal and a bearing block.

BRIEF DESCRIPTION OF THE FIGURES

The accompanying figures, which are incorporated in and constitute a part of this specification, illustrate embodiments, and together with the general description given above, and the detailed description of the embodiments given below, serve to explain the principles of the present disclosure.

DETAILED DESCRIPTION

The present application generally relates to structures and/or methods for incorporating ceramic or refractory materials within a roller assembly submerged within molten metal. In some instances, this involves incorporating ceramic or refractory material between a journal and a bearing block. In such a configuration, it has been found that the presence of the ceramic or refractory material reduces wear on the journal that may result through rotation of the journal relative to the bearing block. In addition, the presence of the ceramic or refractory material may also reduce the propensity of the journal to be subject to chemical attack from the molten metal.

Figure 1:
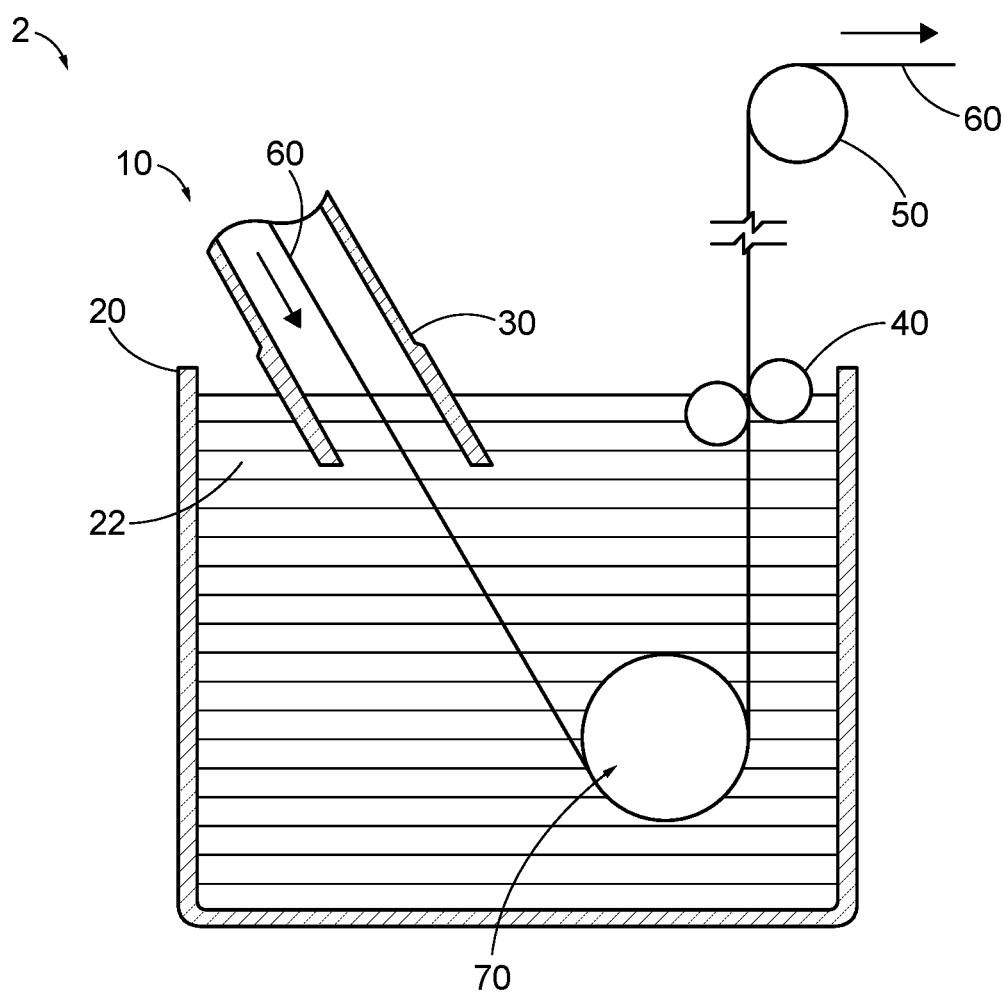
FIG. 1 depicts a schematic view of an aluminizing portion of a continuous steel processing line.

FIG. 1 shows a schematic cross-sectional representation of an aluminizing portion (10) of a steel processing line (2), such as a continuous steel processing line. As can be seen, aluminizing portion (10) includes a dip tank (20), an introducer sheath (30), one or more stabilizer rolls (40), and a redirector roll (50). As will be understood, aluminizing portion (10) is generally configured to receive an elongate steel sheet (60) for aluminizing steel sheet (60). Dip tank (20) is defined by a solid wall configured to receive molten aluminum (22). Dip tank (20) is generally lined with certain ceramic refractory materials that are particularly suited to contain molten aluminum. Although dip tank (20) is described herein as being filled with molten aluminum, it should be understood that in other examples dip tank (20) may be filed with numerous alternative molten metals such as zinc and alloys thereof. Thus, all examples described herein may be applied in environments where other molten metals are used even though the examples herein are described as being used in the molten aluminum context. A stab roll assembly (70) is submerged within molten aluminum (22). As will be described in greater detail below, stab roll assembly (70) is generally configured to rotate and thereby redirect steel sheet (60) out of dip tank (20).

Introducer sheath (30) is configured to be partially submerged within molten aluminum (22). Accordingly, it should be understood that introducer sheath (30) generally provides an air tight seal around steel sheet (60) during entry into molten aluminum (22). In some instances, introducer sheath (30) is filled entirely with an inert gas such as argon or carbon dioxide to limit chemical reactions that may occur during entry of steel sheet (60) into molten aluminum (22). Although aluminizing portion (10) of the present example includes introducer sheath (30), it should be understood that introducer sheath (30) is entirely optional and is omitted in some examples.

One or more stabilizer rolls (40) are positioned relative to dip tank (20) to stabilize steel sheet (60) as steel sheet (60) exits molten aluminum (22). Thus, it should be understood that stabilizer rolls (40) are generally configured to promote stability of steel sheet (60) at various stages during the aluminizing procedure. Although aluminizing portion (10) of the present example is shown as including one group of two stabilizer rolls (40), it should be understood that any suitable number and any suitable grouping of stabilizer rolls (40) may be used. For instance, in some examples aluminizing portion (10) is equipped with a group of one or more stabilizer rolls (40) as steel sheet (60) both exits and enters molten aluminum (22). In addition, or in the alternative, in some examples aluminizing portion (10) is equipped with a grouping of one or more stabilizing rolls (40) as steel sheet (60) adjacent stab roll assembly (70). In still other examples, stabilizer rolls (40) are omitted entirely. Of course, various alternative configurations for stabilizer rolls (40) will be apparent to those of ordinary skill in the art in view of the teachings herein.

Figure 1A:
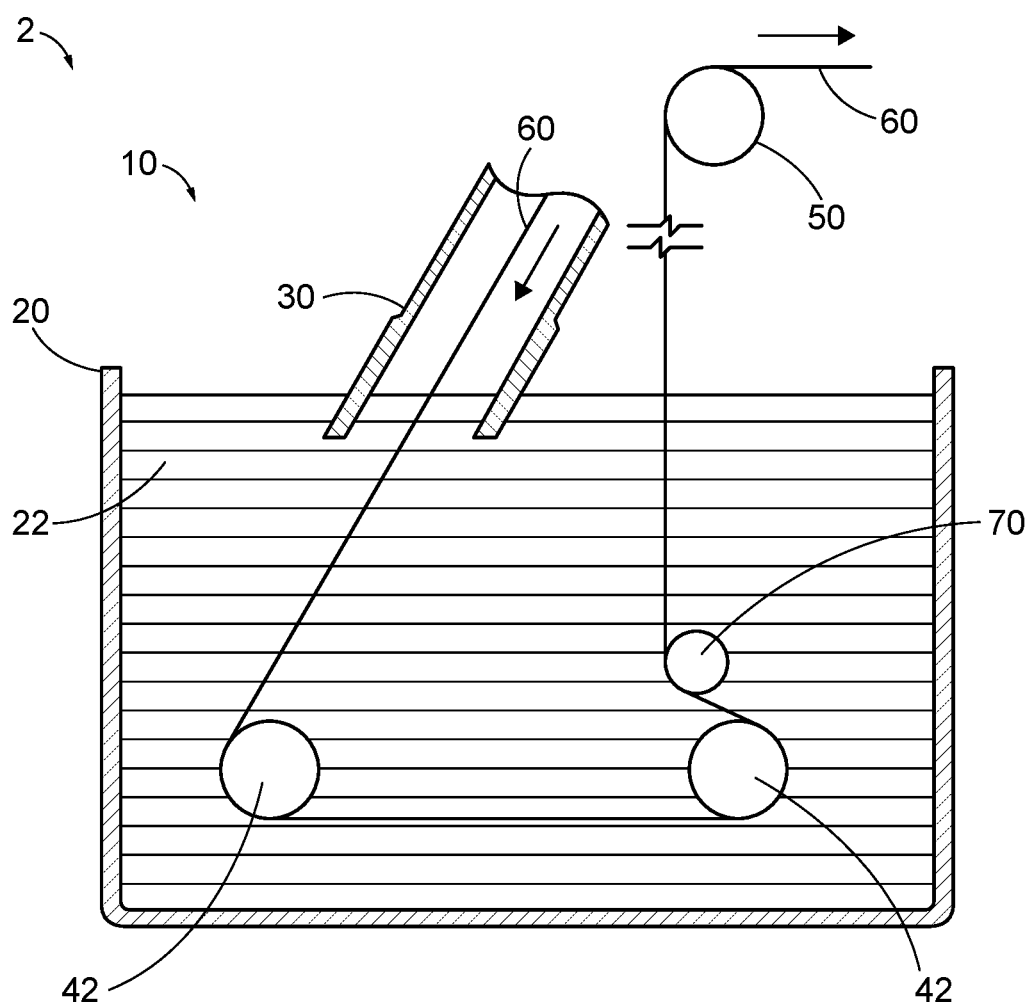
FIG. 1A depicts a schematic view of an alternative configuration for the aluminizing portion of FIG. 1.

FIG. 1A shows an alternative configuration of aluminizing portion (10) with stabilizer rolls (40) omitted. In lieu of, or in alternative to, stabilizer rolls (40), the alternative configuration shown in FIG. 1A includes two sink rolls (42) disposed entirely within dip tank (20). Sink rolls (42) generally operate similarly to other rolls described herein. For instance, sink rolls (42) are generally configured to manipulate steel sheet (60) through various portions of the aluminizing process. In the present example, sink rolls (42) manipulate steel sheet (60) within molten aluminum (22) to promote complete coating of steel sheet (60). Sink rolls (42) additionally provide for an increased amount of travel path through motel aluminum (22). This feature generally increases the time in which steel sheet (60) is disposed within molten aluminum (22). As will be described in greater detail below, once steel sheet (60) passes through sink rolls (42), steel sheet (60) is then redirected upwardly in a desired direction by stab roll assembly (70). Although not shown, it should be understood that the configuration shown in FIG. 1A also includes stabilizer rolls (40) disposed above or adjacent to stab roll assembly (70). It should also be understood that although FIGS. 1 and 1A both illustrate discrete configurations for aluminizing portion (10), in other examples aluminizing portion (10) includes other alternative configurations that combine various elements from the configurations shown in FIGS. 1 and 1A.

Referring to both FIGS. 1 and 1A, redirector roll (50) is generally configured to redirect steel sheet (60) to other portions of steel processing line (2) after steel sheet (60) has been aluminized. Although aluminizing portion (10) of the present example is shown with only a single redirector roll (50), it should be understood that in other examples any suitable number of redirector rolls (50) may be used. For instance, in some examples other redirector rolls (50) are incorporated into aluminizing portion (10) to manipulate steel sheet (60) to any desired angle relative to dip tank (20). In addition, it should be understood that any redirector roll (50) used with aluminizing portion (10) may be powered to drive steel sheet (60) through aluminizing portion (10). Of course, various alternative configurations for redirector roll (50) will be apparent to those of ordinary skill in the art in view of the teachings herein.

Figure 2:
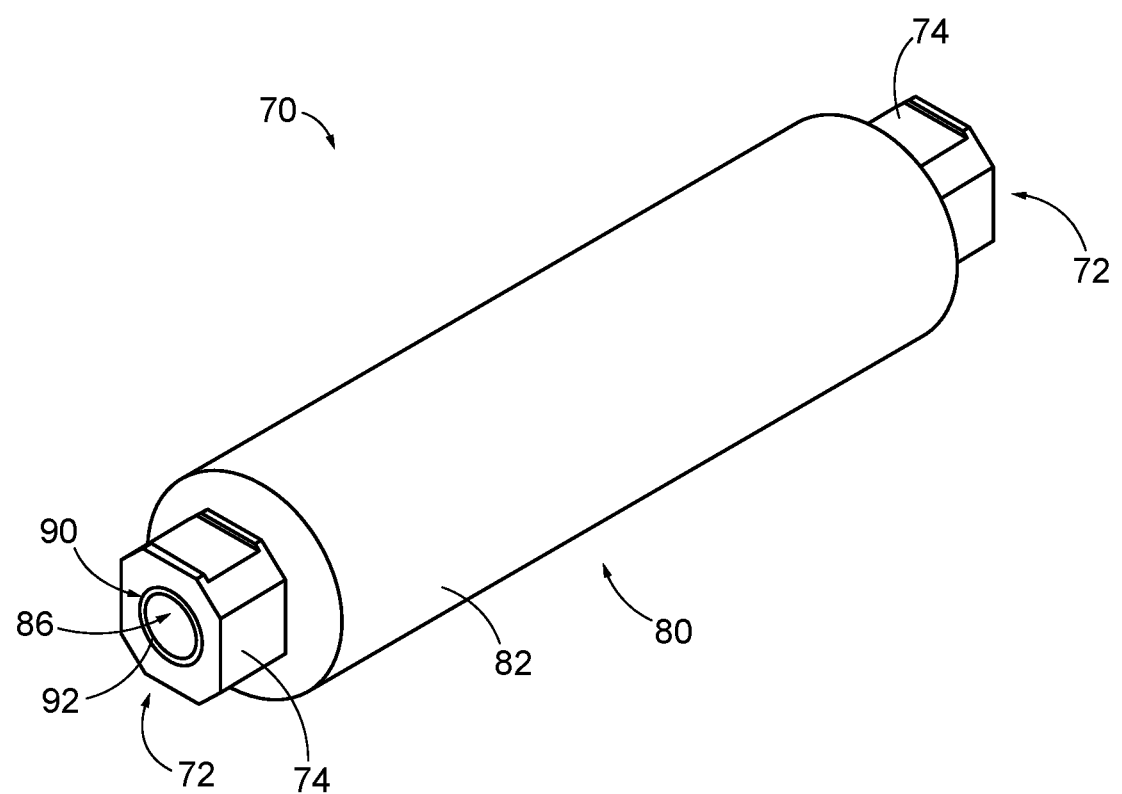
FIG. 2 depicts a perspective view of a stab roll assembly that may be readily incorporated into the aluminizing portion of FIG. 1.

Stab roll assembly (70) is shown in greater detail in FIG. 2. As can be seen, stab roll assembly (70) includes two bearing blocks (72), a stab roll (80), and a roller sleeve (90) disposed between each bearing bock (72) and stab roll (80). Each bearing block (72) is generally configured to receive at least a portion of stab roll (80) to promote rotation of stab roll (80) relative to bearing block (72). Although not shown, it should be understood that each bearing block (72) is generally coupled to a fixture or other structure to hold each bearing bock (72) in position within dip tank (20).

Figure 3:
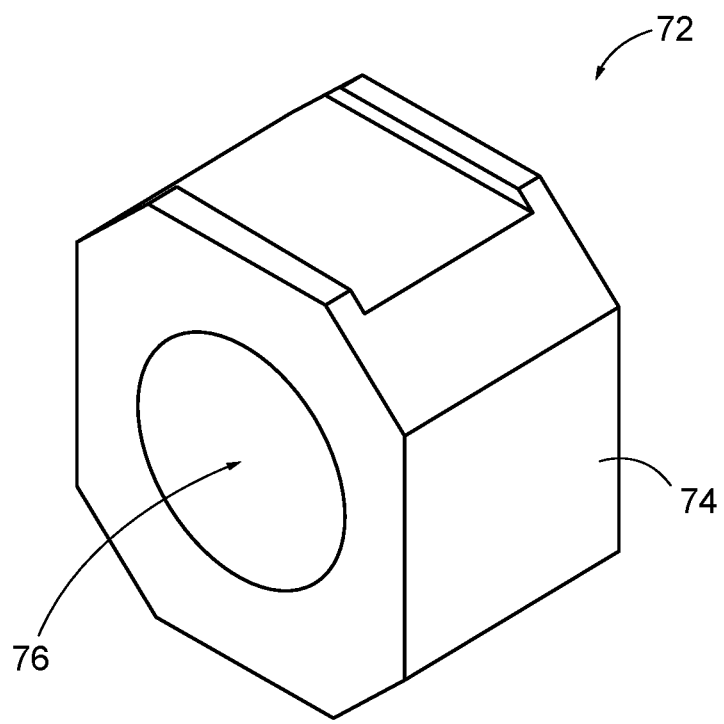
FIG. 3 depicts a perspective view of a bearing block of the stab roll assembly of FIG. 2.

An illustrative bearing block (72) is best seen in FIG. 3. As can be seen, bearing block (72) includes a generally octagonal body (74). The octagonal shape of body (74) is generally configured to provide surfaces by which a fixture or other structure can attach to bearing block (72) to position bearing block (72) within dip tank (20). Although body (72) of the present example is shown with octagonal structure, it should be understood that in other examples other suitable structures may be used such as square, hexagonal, triangular, and/or etc.

Regardless of the particular shape used for body (74), body (74) defines a receiving bore (76) through the center of bearing block (72). Receiving bore (76) is generally defined by a cylindrical shape. As will be described in greater detail below, receiving bore (76) is configured to receive roller sleeve (90) and at least a portion of stab roll (80) to permit roller sleeve (90) to freely rotate within bore (76).

Bearing block (72) comprises a ceramic material that has high strength and is resistant to wear at high temperature. This ceramic material may additionally have a low coefficient of thermal expansion, resistance to thermal shock, resistance to wetting by molten metal, resistance to corrosion, and is substantially chemically inert to molten non-ferrous metals. By way of example only, suitable ceramic materials may include a class of ceramics known as SiAlON ceramics. SiAlON ceramics are high-temperature refractory materials that may be used in handling molten aluminum. SiAlON ceramics generally exhibit good thermal shock resistance, high strength at high temperatures, exceptional resistance to wetting by molten aluminum, and high corrosion resistance in the presence of molten non-ferrous metals. Bearing block (72) of the present example comprises CRYSTON CN178 manufactured by Saint-Gobain High-Performance Refractories, although numerous SiAlON class ceramics may be used.

Figure 4:
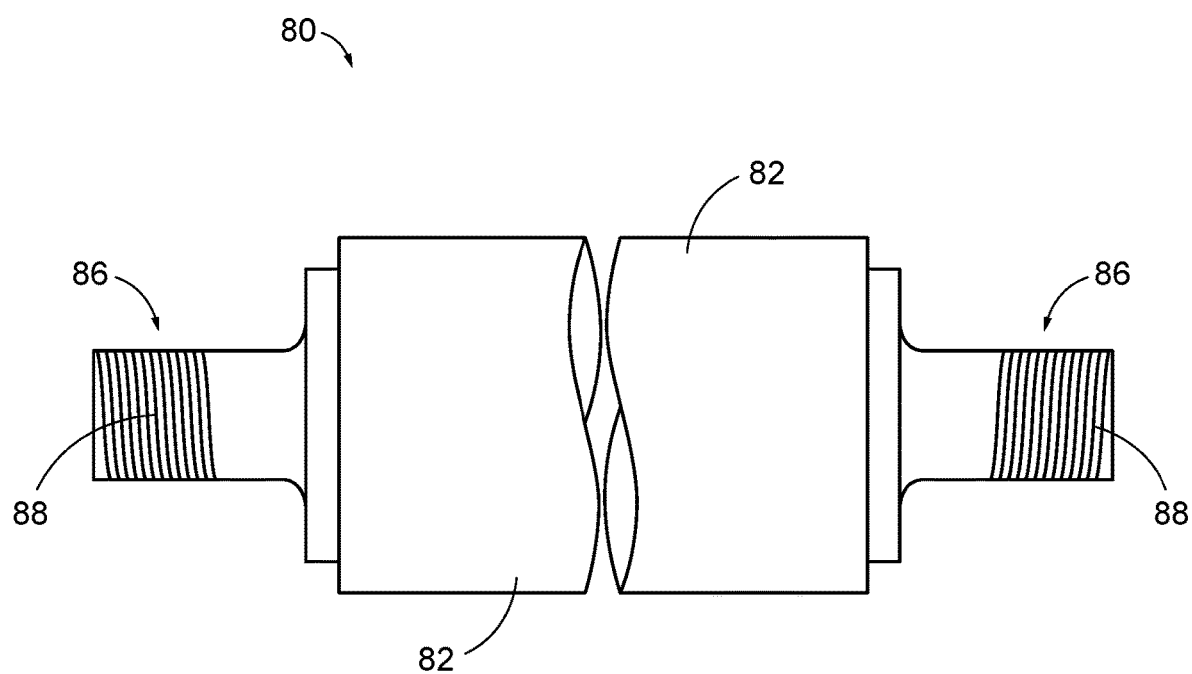
FIG. 4 depicts a front elevational view of a stab roll of the stab roll assembly of FIG. 2.

Stab roll (80) is shown in FIG. 4. As can be seen, stab roll (80) includes a roll portion (82) and a journal (86) extending from each side of roll portion (82). Generally, roll portion (82) and journal (86) are formed by a single integral component comprising steel or another metallic alloy. Roll portion (82) comprises a generally elongate cylindrical shape. The cylindrical shape of roll portion (82) is generally configured to receive steel sheet (60) to permit at least a portion of steel sheet (60) to wrap around at least a portion of roll portion (82). Thus, it should be understood that particular width of roll portion (82) generally corresponds to the width of steel sheet (60).

As described above, each journal (86) extends outwardly from roll portion (82). Each journal (86) comprises a generally cylindrical shape with an outer diameter that is less than the outer diameter defined by roll portion (82). Each journal (86) is sized to be received by bore (76) of a respective bearing block (72). However, as will be described in greater detail below, each journal (86) is generally undersized relative to bore (76) of bearing block (72) to permit space for roller sleeve (90) disposed between bearing bock (72) and journal (86).

In one embodiment, each journal (86) further includes threading (88) disposed on the outer surface of each journal (86). As will be described in greater detail below, threading (88) is generally configured to engage corresponding features of each respective roller sleeve (90) to couple each roller sleeve (90) to each journal (86). In the present example, threading (88) on each journal (86) is oriented to account for rotation of stab roll (80). For instance, if one journal (86) includes right hand threading, the opposite journal (86) includes left hand threading. This configuration of threading (88) prevents each roller sleeve (90) from becoming loose or otherwise unscrewing as stab roll (80) is rotated by friction between steel sheet (60) and roll portion (82). In some examples, threading (88) may include rounded peaks to accommodate variation in the internal geometry of roller sleeve (90) as will be described in greater detail below.

Figure 5:
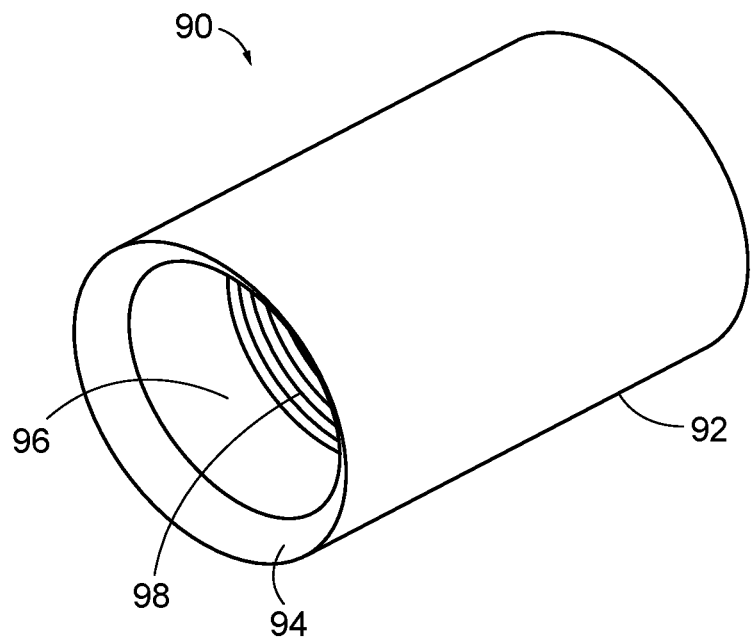
FIG. 5 depicts perspective view of a roller sleeve of the stab roll assembly of FIG. 2.
Figure 6:
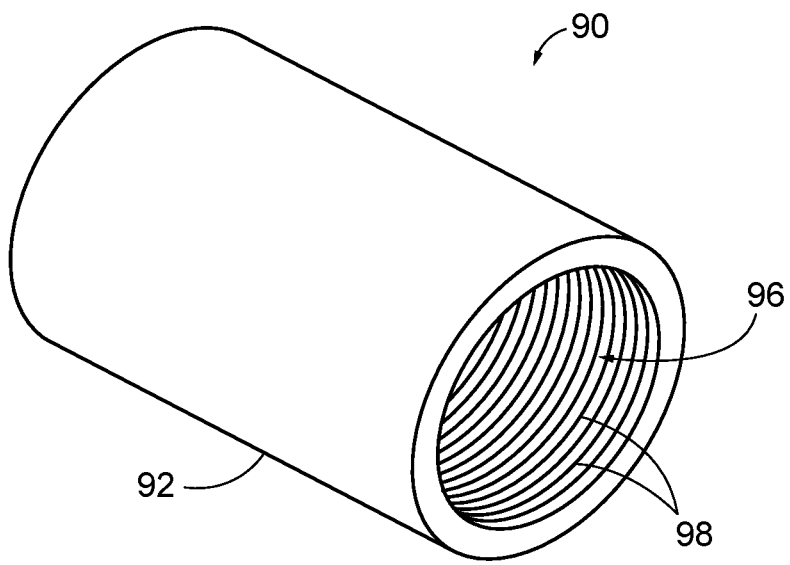
FIG. 6 depicts another perspective view of the roller sleeve of FIG. 5.

An illustrative roller sleeve (90) is shown in FIGS. 5 and 6. Roller sleeve (90) is generally configured to provide a durable non-reactive barrier between a respective journal (86) and a respective bearing bock (72). As will be understood, roller sleeve (90) generally rotates with journal (86) such that roller sleeve (90) rotates within bearing bock (72) relative to bearing block (72). As can be seen, roller sleeve (90) comprises a generally cylindrical body (92). At least one side of body (92) includes a chamfered or beveled edge (94). Edge (94) is generally configured to abut an interface between a respective journal (86) and roll portion (82). Although edge (94) is shown has having a generally chamfered or beveled shape, it should be understood that any other suitable shape may be used such as a fillet shape, a squared shape, a j-groove, or etc.

Body (92) defines a cylindrical bore (96) extending through roller sleeve (90). The interior of bore (96) includes threading (98) extending at least partially though the length of bore (96). Threading (98) is generally configured to engage threading (88) on the outer diameter of a respective journal (86). Thus it should be understood that threading within bore (96) is configured to mechanically fasten roller sleeve (90) to a respective journal (86).

Figure 7:
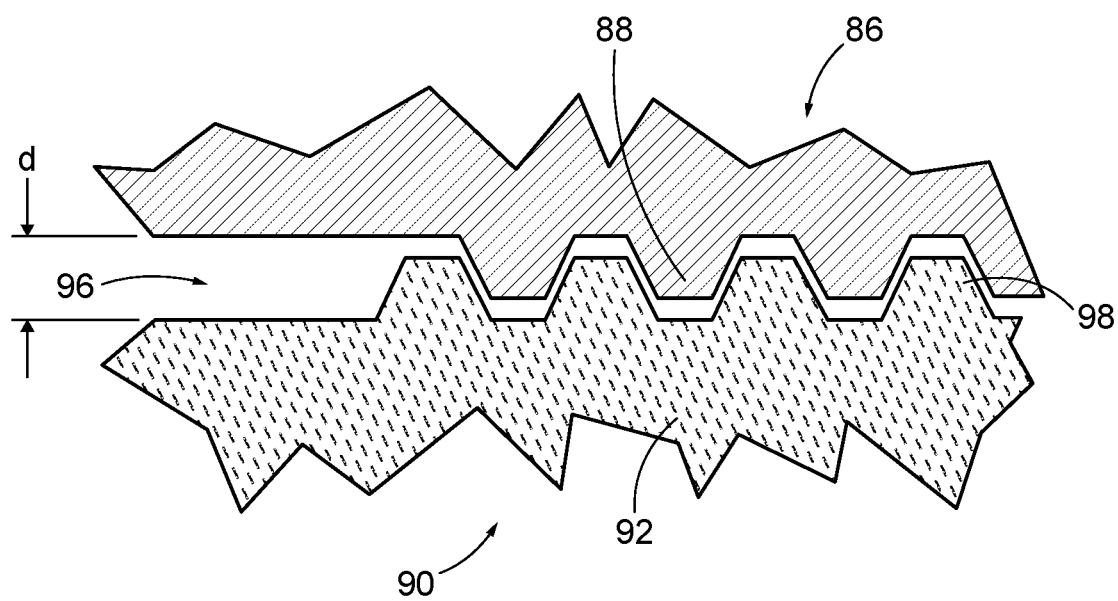
FIG. 7 depicts a partial front cross-sectional view of a coupling between the stab roll of FIG. 4 and the roller sleeve of FIG. 5.

The inner diameter of bore (96) generally corresponds to the outer diameter of each journal (86). However, as best seen in FIG. 7, the present example includes a predetermined clearance (d) between the inner diameter of bore (96) and the outer diameter of journal (86). Initially, it was theorized that this clearance (d) could be derived from the difference between the thermal expansion ratio of journal (86) and the thermal expansion ratio of roller sleeve (90) such that once both journal (86) and roller sleeve (90) approach the temperature of dip tank (20), this clearance (d) would be substantially eliminated. However, in the present example, the clearance (d) between bore (96) and journal (86) is unexpectedly not exclusively tied to the thermal expansion ratios of journal (86) and roller sleeve (90). In particular, it has been found that some clearance (d) between journal (86) and roller sleeve (90) at temperature of dip tank (20) is beneficial to improving the durability of roller sleeve (90) during the aluminizing procedure. Thus, it should be understood that in the present example at least some clearance (d) is maintained between the inner diameter of bore (96) and the outer diameter of journal (86) throughout the aluminizing procedure. In some examples, a suitable clearance (d) may be approximately 0.220 in. In other examples, clearance (d) may be between about 0.220 and 0.200 in. In some examples, the width of threading (88) may also provide some width clearance. In these examples, this width clearance may vary between approximately 0.005 in. and approximately 0.030 in.

Although the clearance (d) between the inner diameter of bore (96) and the outer diameter of journal (86) referred to above is described as being beneficial for improving the durability of roller sleeve (90), it should be understood that this clearance (d) is also limited in the present example. For instance, if the clearance (d) between the inner diameter of bore (96) and the outer diameter of journal (86) is too significant, some wetting of the molten aluminum (22) may occur, thereby transporting molten aluminum (22) into the clearance (d) between the inner diameter of bore (96) and the outer diameter of journal (86). Although this may depend at least in part on the material of roller sleeve (90), it should be understood that in the present example the clearance (d) between the inner diameter of bore (96) and the outer diameter of journal (86) is limited so as to minimize or prevent transport of molten aluminum (22) into the clearance (d).

Roller sleeve (90) comprises a ceramic material that has high strength and is resistant to wear at high temperature. This ceramic material additionally may have a low coefficient of thermal expansion, resistance to thermal shock, resistance to wetting by molten metal, resistance to corrosion, and is substantially chemically inert to molten non-ferrous metals. By way of example only, suitable ceramic materials may include a class of ceramics known as SiAlON ceramics. As described above, SiAlON ceramics are high-temperature refractory materials that may be used in handling molten aluminum. SiAlON ceramics generally exhibit good thermal shock resistance, high strength at high temperatures, exceptional resistance to wetting by molten aluminum, and high corrosion resistance in the presence of molten non-ferrous metals. Roller sleeve (90) of the present example comprises ADVANCER nitride bonded silicon carbide manufactured by Saint-Gobain Ceramics, although numerous SiAlON-class ceramics may be used.

In an exemplary use as best seen in FIG. 1, steel sheet (60) enters dip tank (20) via introducer sheath (30). Although not shown, it should be understood that prior to entry, steel sheet (60) may be subjected to a variety of other steel processing operations in other portions of steel processing line (2). For instance, steel sheet (60) may be subjected to hot or cold reduction rolling, various heat treatments, pickling, and/or etc. Alternatively, other steel processing operations may be eliminated such that aluminizing portion (10) is configured as a standalone aluminizing line in some examples.

Steel sheet (60) is submerged within molten aluminum (22) upon entry into dip tank (20). Steel sheet (60) is manipulated away from introducer sheath (30) via stab roll assembly (70). Steel sheet (60) then wraps around stab roll (80) of stab roll assembly (70). Friction between steel sheet (60) and roll portion (82) of stab roll (80) causes stab roll (80) to rotate as steel sheet (60) moves relative to stab roll assembly (70). Rotation of stab roll (80) causes corresponding rotation of each journal (86), which also causes rotation of each roller sleeve (90) via engagement between threading (88, 98). Due to the opposite threading (88) on each journal (86), each roller sleeve (90) stays secured to each respective journal (86) due to the rotation of each journal (86). It should be understood that in some examples only a portion of threading (88) of journal (86) may contact threading (98) of roller sleeve (90) at a given time. For instance, during operation, steel sheet (60) may pull stab roll (80) in a particular direction. This will cause journal (86) to move laterally within roller sleeve (90) due to clearance such that journal (86) and roller sleeve (90) are not precisely coaxially aligned. When this occurs, depending on the size of clearance (d), one side of threading (88) of journal (86) may disengage from threading (98) of roller sleeve (90). Although some disengagement may occur, the coupling function of threading (88, 98) may still be retained due to full engagement of threading (88, 98) on the opposite side of journal (86) and roller sleeve (90). Thus, each journal (86) and each roller sleeve (90) rotate together within a respective bearing block (72), while each bearing block (72) secures the axial position of stab roll (80) within dip tank (20).

As steel sheet (60) moves around stab roll (80), steel sheet (60) is directed upwardly via one or more stabilizer rolls (40) and/or redirector roll (50). Each stabilizer roll (40) then stabilizes steel sheet (60) as steel sheet (60) exits dip tank (20). Steel sheet (60) is then redirected to other portions of steel processing line (2) via redirector roll (50). Although not shown, it should be understood that after aluminizing portion (10), steel sheet (60) may be subjected to various other steel processing steps in other portions of steel processing line (2). For instance, steel sheet (60) may be subjected to further hot or cold reduction rolling, various heat treatments, pickling, hot or cold stamping, and/or etc.

Although roller sleeves (90) are described herein as being incorporated into stab roll assembly (70), it should be understood that in other examples roller sleeves (90) may be readily incorporated into any other roll described herein. For instance, in some examples roller sleeve (90) is readily incorporated into stabilizer rolls (40) or sink rolls (42) described above. In such examples, both stabilizer rolls (40) and/or sink rolls (42) include bearing blocks and journals substantially the same as bearing blocks (72) and journals (86) described above. Accordingly, it should be understood that roller sleeves (90) may be substantially the same regardless of whether roller sleeves (90) are used in connection with stab roll assembly (70), stabilizer rolls (40), and/or sink rolls (42). Of course, when roller sleeves (90) are incorporated into other rolls, various adjustments may be made to accommodate differently sized journals, bearing blocks, and/or roller portions.

Figure 8:
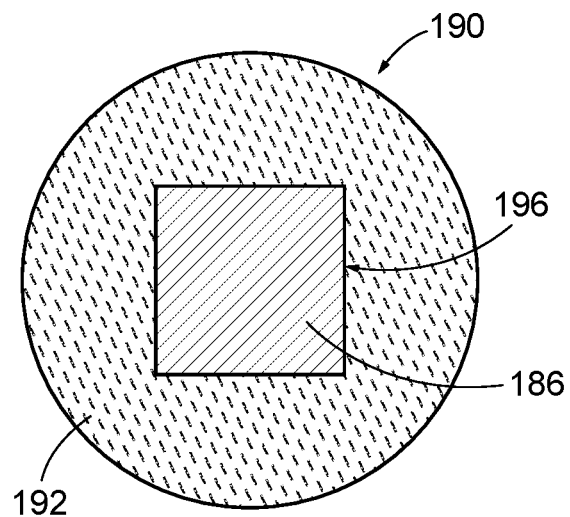
FIG. 8 depicts a side cross-sectional view of an alternative journal and roller sleeve that may be readily incorporated into the stab roll of FIG. 4.
Figure 9:
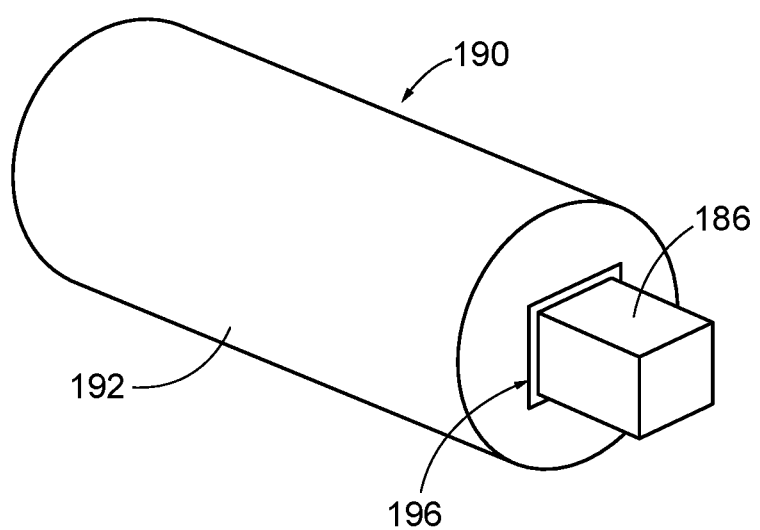
FIG. 9 depicts a perspective view of the journal and roller sleeve of FIG. 8.

FIGS. 8 and 9 show an exemplary alternative journal (186) and roller sleeve (190) that may be readily incorporated into stab roll assembly (70) described above. It should be understood that unless otherwise noted herein, journal (186) and roller sleeve (190) are respectively substantially similar to journals (86) and roller sleeves (90) described above. Journal (186) of the present example comprises a generally square lateral cross-section. As will be described in greater detail below, this generally square shape permits journal (186) to engage roller sleeve (190) and thereby induce rotation of roller sleeve (190) relative to a respective bearing block (72). As will be understood, this configuration permits structures similar to threading (88) of journal (86) to be omitted from journal (186).

Roller sleeve (190) comprises a cylindrical body (192) that is generally configured to fit over journal (186). Body (192) defines a bore (196) extending entirely through roller sleeve (190). Bore (196) of the present example defines a square-shaped lateral cross-section that generally corresponds to the shape of journal (186) described above.

Bore (196) of the present example is generally sized to receive journal (186). Although bore (196) of the present example is generally sized to receive journal (186) it should be understood that in the present example, bore (196) is also sized to provide at least some clearance relative to the exterior of journal (186) as similarity described above with respect to roller sleeve (90) and journal (86). As with clearance (d) described above, the clearance associated with roller sleeve (90) and journal (86) is generally configured to be maintained throughout the aluminizing procedure despite expansion of roller sleeve (190) and/or journal (86) due to the heat encountered within dip tank (20). As also described above, the clearance associated with roller sleeve (190) and journal (186) is also sized to minimize or prevent transport of molten aluminum (22) into the cavity defined by the clearance.

As described above, the corresponding square shapes defined by journal (186) and bore (196) of roller sleeve (190) are generally configured to permit journal (186) to communicate rotary motion to roller sleeve (190). Although corresponding square shapes are shown herein, it should be understood that numerous alternative cross-sectional shapes may be used. For instance, in some examples journal (186) and bore (196) of roller sleeve (190) define a corresponding triangular, ovular, or rectangular shape. In other examples, both journal (186) and bore (196) of roller sleeve (190) define a generally cylindrical shape, but may also be keyed to still permit communication of rotation from journal (186) to roller sleeve (190). Of course, numerous alternative geometries for journal (186) and bore (196) of roller sleeve (190) will be apparent to those of ordinary skill in the art in view of the teachings herein. In each case, there is a mechanical locking feature, be it threading or other mechanical lock configuration that restricts motion of the roller sleeve relative to the journal, so as to allow both parts to rotate together with the bore.

Figure 10:
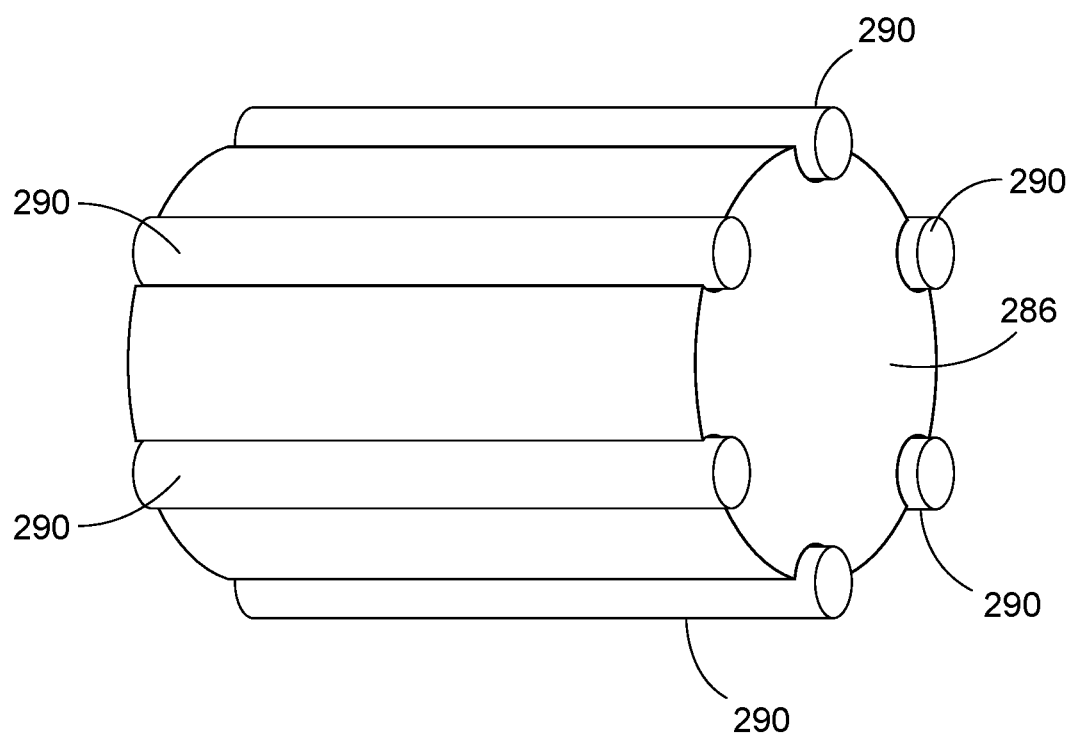
FIG. 10 depicts a perspective view of another alternative journal that may be readily incorporated into the stab roll of FIG. 4.

FIG. 10 shows an alternative journal (286) that may be readily incorporated into stab roll assembly (70) described above. Unlike journal (86) described above, journal (286) of the present example is not configured for use with a structure similar to roller sleeve (90). Instead, journal (86) integrates a series of cylindrical ceramic inserts (290) oriented longitudinally around the outer surface of journal (286). To receive inserts (290), journal (286) is machined to include a plurality of channels (not shown) that are configured to receive inserts (290). However, the channels in the outer surface of journal (286) are sized to accommodate only a portion of each insert (290) such that a portion of each inert (290) protrudes from the outer surface of journal (286). Thus, it should be understood that each inert (290) is configured to engage the interior of bearing block (72), thereby separating the outer surface of journal (286) from the interior of bearing block (72).

Coupling between journal (286) and inserts (290) can be by any suitable means. For instance, in the present example inserts (290) are welded or bonded onto journal (286) by ultrasonic welding, friction welding, soldering, and/or other processes suitable for welding or bonding dissimilar materials. Alternatively, in some examples inserts (290) are secured to journal (286) by a mechanical fastener. In still other examples, the channels in journal (286) and inserts (290) may include complementary coupling features to provide a slide-in or snap fit. Of course, in other examples inserts (290) may be coupled to journal (286) by any other suitable means that will be apparent to those of ordinary skill in the art in view of the teachings herein.

Figure 11:
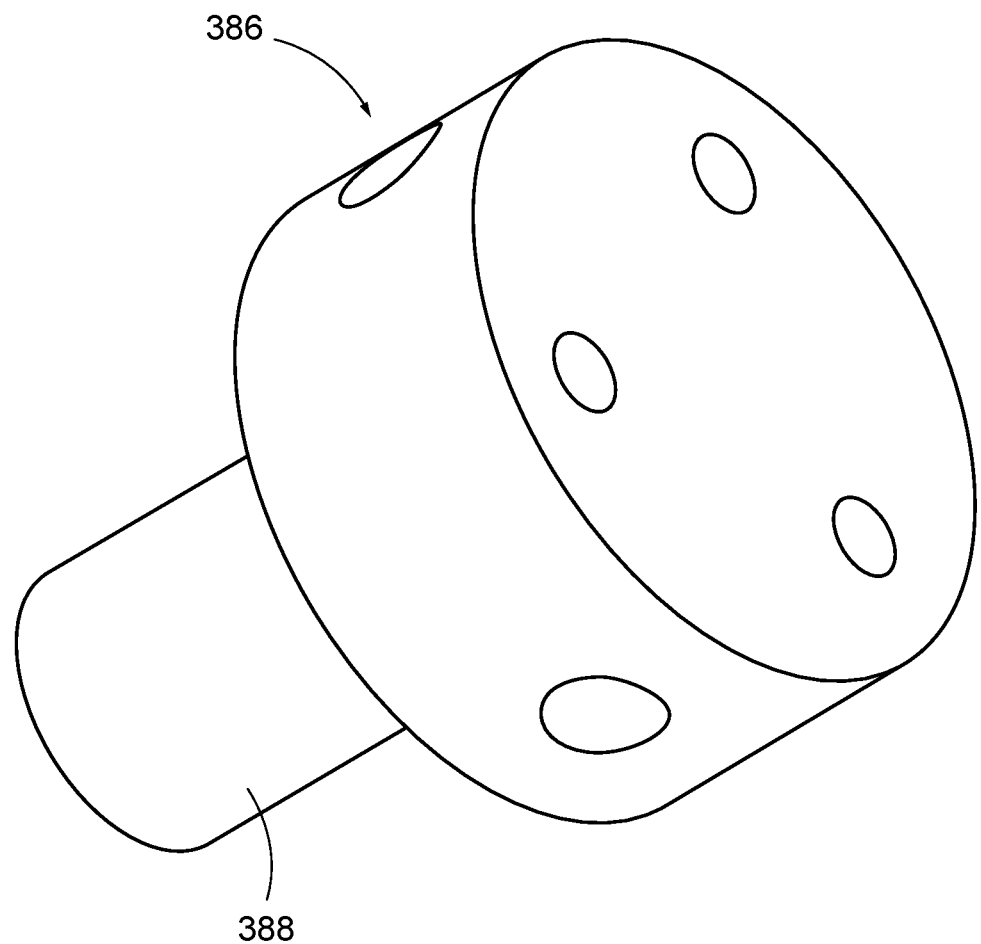
FIG. 11 depicts a perspective view of still another alternative journal that may be readily incorporated into the stab roll of FIG. 4.

In some instances, it may be desirable to incorporate inserts (290) into journal (286) entirely. For instance, FIG. 11 illustrates an alternative journal (386) that may be readily incorporated into stab roll (80). Instead of including structures similar to inserts (290) described above as separate components, journal (386) itself comprises a ceramic material consistent with the properties described above with respect to roller sleeve (90). In the present example, journal (386) is removably couplable to roll portion (82) of stab roll (80) instead of being integral with roll portion (82). Thus, journal (386) of the present example includes a roller plug (388) that is configured to fit within a corresponding opening that may be bored within roll portion (82) of stab roll (80). Although not shown, it should be understood that in the present example journal (386) is mechanically locked to stab roll (80) by a series of pins or other mechanical fasteners.

In other examples the entire stab roll (80) can comprise a ceramic material, thus removing the need to separate journal (386) from roll portion (82). Of course, various alternative configurations for journal (286) may be apparent to those of ordinary skill in the art in view of the teachings herein.

It will be understood various modifications may be made to this invention without departing from the spirit and scope of it. Therefore, the limits of this invention should be determined from the appended claims.

A series of tests were performed to evaluate journal (86) and roller sleeve (90) described above to identify a desired clearance (d). This series of tests is detailed below in the following Examples. It should be understood that the following Examples are merely for illustrative purposes and that in other instances, various alternative characteristics may be used as will be understood by those of skill in the art in view of the teachings herein.

EXAMPLE 1

In an initial test, a structure similar to journal (86) described above was tested to establish a measured coefficient of thermal expansion of the journal. The tested journal was prepared as a mockup portion of stab roll such that the journal consisted of the journal attached to a hub corresponding to an end of stab roll. While the journal was at room temperature (e.g., approximately 70° F.), measurements were acquired of all surfaces such as the outer diameter of the journal, the thread peaks, and the roots of the threads. The journal was subsequently heated to a temperature of 1,350° F. Immediately after heating, the same measurements were taken while the journal was in the heated condition. Measurements taken at room temperature were compared against measurements taken while the journal was in the heated condition. This comparison was then used to calculate an experimentally based coefficient of thermal expansion for the journal. Thus, the experimentally based coefficient of thermal expansion of the journal was calculated to be $9.1 \times 10^{-6}$ in/in/° F. Based on this calculation, it was hypothesized that a desirable clearance (d) between journal (86) and roller sleeve (90) would be approximately 0.020 in.

EXAMPLE 2

In a second trial, the experimentally based coefficient of thermal expansion and corresponding hypothesized desirable clearance (d) between journal (86) and roller sleeve (90) (identified in EXAMPLE 1) was tested for validation under operating temperatures. A roller sleeve similar to roller sleeve (90), described above, was provided by St. Gobain Ceramics. The roller sleeve, however, departed from specification. In particular, an inner diameter of the roller sleeve was tapered and included some burrs. In addition, the roller sleeve was slightly out of round. Nonetheless, testing proceeded.

Prior to testing, machining was performed on the journal. The journal was machined to adjust the clearance to at least 0.042 in between the inner diameter of the roller sleeve and the outer diameter of the journal. This clearance was set to provide an approximate size-to-size fit between the journal and the roller sleeve at high temperature (e.g., 1,150° F.).

After machining, the roller sleeve and the journal were mated. After mating, it was observed that due to the out of round character of the roller sleeve, limited to no clearance was present in some localized areas around the outer diameter of the journal. To improve the clearance and to provide an overall loose fit, the roller sleeve was unscrewed from the journal approximate ¼ turn. In this configuration, the roller sleeve and the journal were then subject to a furnace based heat treatment.

The heat treatment included heating the roller sleeve and the journal as mated to 1,150° F. in 150° F. per hour intervals. The assembly of the roller sleeve and the journal was removed from the furnace at 500° and 900° F. to observe the clearance. At 500° F., it was observed that there was "still plenty of clearance" after tapping the assembly with a 4 inch×4 inch elongate wood block. At 900° F., it was observed that no clearance was visibly detectable. In addition, it was observed that the roller sleeve had chipped and formed a visible crack. At this stage, it was hypothesized that chipping and cracking might be avoided by reducing another 0.030 in. to 0.040 in. from the outer diameter of the journal.

After completion of the heat treatment, additional chips in the roller sleeve were observed. This testing suggested that the clearance was necessary to aid installation and to avoid any possibility of roller sleeve fracture during operation. In addition, it was further hypothesized that the durability of the roller sleeve might be improved by machining the threads of the roller sleeve or the journal for engagement of only ½ of the thread depth. At the time of testing, thread depth was 0.200". Thus, applying the hypothesized reduction in thread depth, additional durability of the roller sleeve might be achieved by having only 0.100" of the threads engage with each other. Based on this, it was suggested that up to 0.060" of material might be removed from both threads of the roller sleeve and the journal to provide a desired fit.

EXAMPLE 3

After the trial described above in Example 2, an in situ trial was conducted. For this in situ trial, a stab roll assembly similar to stab roll assembly (70) described above was prepared. Like with stab roll assembly (70), the stab roll assembly included two journals. However, the two journals were prepared such that one journal was configured as a control journal and another journal was configured as a test journal. The control journal was prepared in accordance with standard practices such that a metal journal to bearing block configuration was formed via control journal. The test journal was prepared as similarly described above with respect to journal (86) and included a roller sleeve similar to roller sleeve (90) described above.

The test journal and corresponding roller sleeve were both configured to provide a maximum clearance of 0.220 in between the test journal and corresponding roller sleeve.

This was a substantial increase in clearance relative to the journal and roller sleeve combination tested in Example 2. One factor leading to this clearance was to provide more clearance than was necessary to account for thermal expansion of the journal and/or the roller sleeve. In other words, it was hypothesized that a size-to-size fit between the journal and the roller sleeve during operation at temperature was not necessary and could be detrimental. Instead, it was hypothesized that force exerted upon the stab roll during operation would only require a single side of the threads of the journal to engage the threads of the roller sleeve. In other words, only ½ engagement of the threads was to be required in total because full engagement might occur on one side of the journal and limited engagement might occur on the other side of the journal. However, some limit to the clearance was still desirable to support the load present during the operation of the stab roll assembly. In addition, some limit to the clearance was still desirable to avoid penetration of molten aluminum between the journal and the roller sleeve. Thus, the test journal and corresponding roller sleeve were both configured to provide a max clearance of 0.220 in. Prior to test initiation a portion of the roller sleeve was chipped. Thus, the roller sleeve only partially covered the test journal throughout the test.

The stab roll assembly was then inserted into a molten aluminum bath for use in aluminizing steel sheet. A total of 583,521 ft. of steel sheet was processed with the stab roll assembly in service. Upon removal of the stab roll assembly, fracture on the exterior of the bearing block was visible. Upon removal of bearing block from the stab roll fixture, the bearing block separated into four separate parts. Upon separation, each fracture surface was completely coated with aluminum metal. This coating pattern suggested that fracture of the bearing block occurred during service rather than during cooling via thermal shock. A large void was present in two mating fracture surfaces. Thus, the cracking of the bearing block was determined to be unrelated to the use of the roller sleeve and test journal combination.

The roller sleeve exhibited limited visible wear as indicated by no grooving and generally limited loss of thickness. The portion of the roller sleeve that was chipped prior to testing exhibited some increase in chipped area. However, the chipping did not spread along the length of the roller sleeve and did not affect the roller sleeve serviceability. In comparison to the control journal, the roller sleeve exhibited generally less wear, with the control journal exhibiting more typical wear. In quantitative terms, the wear rate of the roller sleeve was decreased substantially in comparison to the wear rate of the control journal based on comparisons between inner diameter measurements of the bearing blocks (before and after testing), the outer diameter of the control journal, and general observations with respect to wear appearance.

EXAMPLE 4

Another journal similar to journal (86) described above has been prepared. The journal has been prepared to provide a clearance of 0.220 in. +0 in./0.005 in. when coupled to a roller sleeve similar to roller sleeve (90) described above. The threads on the journal were machined to provide rounded peaks to better accommodate irregular inner diameter geometry provided by the roller sleeve. Measurements of lateral movement between the journal and the roller sleeve have been acquired. This measurement resulted in 0.020 in. to 0.040 in. lateral movement with as much as 0.060 in. to 0.155 in. considered to be acceptable.

What is claimed is:

1. A bearing assembly for use in a coating line, wherein the bearing assembly is configured to support a first journal of a roll relative to a fixture of a dip tub, wherein the bearing assembly is configured for submersion in molten metal, wherein the bearing assembly consists of:
   (a) a bearing block, wherein the bearing block defines an opening therein; and
   (b) a roller sleeve, wherein the roller sleeve is disposed within the opening defined by the bearing block between the bearing block and the first journal of the roll, wherein the roller sleeve is configured to rotate relative to the bearing block to reduce wear on the first journal, wherein the roller sleeve defines a gap between an inner surface of the roller sleeve and an outer surface of the first journal.

2. The bearing assembly of claim 1, wherein the gap between the inner surface of the roller sleeve and the outer surface of the first journal is sized to permit at least some lateral movement of the roller sleeve relative to the roll.

3. The bearing assembly of claim 2, wherein the gap between the inner surface of the roller sleeve and the outer surface of the first journal is sized to prevent ingress of molten metal between the inner surface of the roller sleeve and the outer surface of the first journal.

4. A roller assembly, wherein the roller assembly is configured for submersion in molten metal, wherein the roller assembly comprises:
   the bearing assembly of claim 1, wherein the roll includes a rolling portion and the first journal extends axially from the rolling portion.

5. The roller assembly of claim 4, wherein the first journal includes threading.

6. The roller assembly of claim 5, wherein the inner dimension of the roller sleeve includes threading corresponding to the threading of the first journal.

7. The roller assembly of claim 6, wherein the threading of the first journal defines a first pitch direction, wherein the roll further includes a second journal having threading that defines a second pitch direction.

8. The roller assembly of claim 7, wherein the first pitch direction is opposite relative to the second pitch direction such that the threading of the roller sleeve is configured to remain engaged by the threading of a select one of the first journal and the second journal as the roll is rotated in a predetermined direction.

9. The roller assembly of claim 7, wherein the first pitch direction corresponds to a right handed threading, wherein the second pitch direction corresponds to a left handed threading.

10. The roller assembly of claim 4, wherein the roller sleeve comprises a ceramic material.

11. The roller assembly of claim 10, wherein the ceramic material is substantially inert when submerged in the molten metal.

12. The roller assembly of claim 10, wherein the ceramic material has a low coefficient of thermal expansion.

13. The roller assembly of claim 10, wherein the ceramic material is configured to resist wetting of the molten metal.

14. The roller assembly of claim 10, wherein the ceramic material comprises a SiAlON ceramic.

15. The roller assembly of claim 4, wherein the roller assembly is submersed within a dip tub, wherein the dip tub includes a refractory container filled with a quantity of molten metal.

16. The roller assembly of claim 4, wherein the first journal defines a square lateral cross-sectional shape, wherein the opening of the roller sleeve defines a shape corresponding to the square lateral cross-sectional shape of the first journal.

17. The roller assembly of claim 4, wherein the first journal defines a cylindrical shape, wherein the opening of the roller sleeve defines a cylindrical shape corresponding to the cylindrical shape of the first journal.

18. The roller assembly of claim 4, wherein the roll is rotated by friction between an exterior of the roll and a steel sheet moving through a dip tub.

19. The roller assembly of claim 4, wherein the bearing block comprises a ceramic material.

\* \* \* \* \*